United States Patent
Nishisaka

(10) Patent No.: US 9,507,312 B2
(45) Date of Patent: Nov. 29, 2016

(54) LUBRICANT APPLICATION DEVICE WITH A FLICKING MEMBER, CLEANING DEVICE HAVING THE LUBRICANT APPLICATION DEVICE, AND IMAGE FORMING APPARATUS HAVING THE LUBRICANT APPLICATION DEVICE

(71) Applicant: Konica Minolta, Inc., Tokyo (JP)

(72) Inventor: Yusuke Nishisaka, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/537,373

(22) Filed: Nov. 10, 2014

(65) Prior Publication Data

US 2015/0153704 A1 Jun. 4, 2015

(30) Foreign Application Priority Data

Nov. 29, 2013 (JP) ................................. 2013-247266

(51) Int. Cl.
  *G03G 21/00* (2006.01)
  *F16N 7/24* (2006.01)

(52) U.S. Cl.
  CPC ............. *G03G 21/0094* (2013.01); *F16N 7/24* (2013.01); *G03G 21/007* (2013.01); *G03G 21/0011* (2013.01); *G03G 21/0035* (2013.01)

(58) Field of Classification Search
  CPC ............. G03G 21/00; G03G 21/0005; G03G 21/0035; G03G 21/0094; G03G 21/0225; G03G 21/2025; G03G 21/2075; G03G 21/007; G03G 21/0011; F16N 7/24
  USPC ........................................................ 399/346
  See application file for complete search history.

(56) References Cited

U.S. PATENT DOCUMENTS 3,780,391 A * 12/1973 Leenhouts ..................... 15/1.51
5,646,718 A *  7/1997 Suwa et al. .................. 399/350

(Continued)

FOREIGN PATENT DOCUMENTS

| JP | 2000-242135 A  | 9/2000  |
| JP | 2005234044 A   | 9/2005  |
| JP | 2007298817 A1  | 11/2007 |
| JP | 2010-156778 A  | 7/2010  |

(Continued)

OTHER PUBLICATIONS

English translation of Yano, Hidetoshi. Image Forming Device, Sep. 8, 2000, Japanese Patent Office. JP2000-242135.*
Decision of Rejection dated May 31, 2016 for JP Application No. 2013-247266 and English translation.

(Continued)

*Primary Examiner* — David Gray
*Assistant Examiner* — Trevor J Bervik
(74) *Attorney, Agent, or Firm* — Lucas & Mercanti, LLP

(57) ABSTRACT

A lubricant application device includes: a lubricant supply unit; a roller-type rotatable lubricant application member that applies a lubricant agent to a lubricant-applied member, the lubricant agent being supplied from the lubricant supply unit; and a flicking member to be brought into contact with the lubricant application member in a position that is on the downstream side of the lubricant supply unit and is on the upstream side of the lubricant-applied member in the rotation direction of the lubricant application member, the flicking member being brought into contact with the lubricant application member so that the amount of the lubricant agent to be applied to either end portion of the lubricant-applied member becomes smaller than the amount of the lubricant agent to be applied to the middle portion of the lubricant-applied member in the axial direction of the lubricant application member.

22 Claims, 10 Drawing Sheets

(56) References Cited

U.S. PATENT DOCUMENTS

| | | | | |
|---|---|---|---|---|
| 5,655,203 | A | * | 8/1997 | Thayer et al. ............... 399/345 |
| 5,903,797 | A | * | 5/1999 | Daniels et al. ................ 399/34 |
| 6,070,037 | A | * | 5/2000 | Sugihara et al. ............ 399/274 |
| 8,131,177 | B2 | * | 3/2012 | Murao .......................... 399/101 |
| 2010/0202812 | A1 | * | 8/2010 | Watanabe ..................... 399/346 |
| 2011/0164909 | A1 | * | 7/2011 | Nakane et al. ............... 399/346 |
| 2011/0229232 | A1 | * | 9/2011 | Kojima ............... G03G 21/007 399/346 |

FOREIGN PATENT DOCUMENTS

| | | |
|---|---|---|
| JP | 2011059315 A | 3/2011 |
| JP | 2011-170155 A | 9/2011 |
| JP | 2011191524 A | 9/2011 |

OTHER PUBLICATIONS

Notice of Reasons for Rejection dated Dec. 8, 2015 for JP Application No. 2013-247266 and English translation.

* cited by examiner

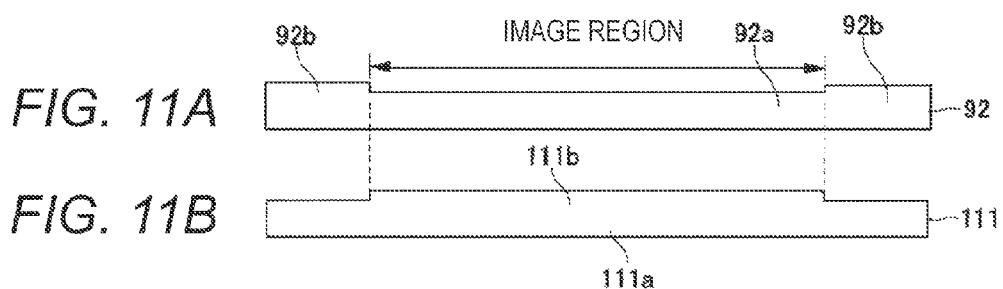
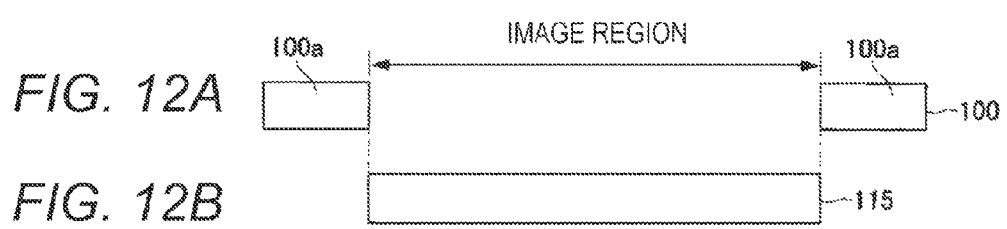
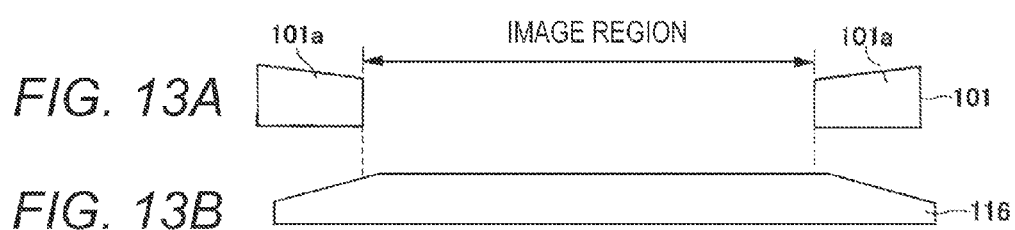

LUBRICANT APPLICATION DEVICE WITH A FLICKING MEMBER, CLEANING DEVICE HAVING THE LUBRICANT APPLICATION DEVICE, AND IMAGE FORMING APPARATUS HAVING THE LUBRICANT APPLICATION DEVICE

The entire disclosure of Japanese Patent Application No. 2013-247266 filed on Nov. 29, 2013 including description, claims, drawings, and abstract are incorporated herein by reference in its entirety.

BACKGROUND OF THE INVENTION

Field of the Invention

The present invention relates to a lubricant application device that applies a lubricant agent to the surface of a lubricant-applied member such as an image bearing member, and further relates to a cleaning device and an image forming apparatus that includes the lubricant application device.

Description of the Related Art

In an image forming apparatus, an electrostatic latent image is formed by exposing a charged photoreceptor based on image data, and the electrostatic latent image is developed as a toner image by applying a developer (toner) to the photoreceptor. This toner image is then transferred onto a recording medium such as a paper sheet, and the paper sheet having the toner image transferred thereon is heated and pressed by a fixing roller. In this manner, the toner image is fixed onto the paper sheet.

Such an image forming apparatus includes a cleaning device that uses a cleaning blade to remove toner (residual toner) remaining on the surface of an image bearing member such as a photoreceptor or an intermediate transfer belt. So as to protect the surface of the image bearing member and reduce friction between the image bearing member and the cleaning blade, a lubricant application device for applying a lubricant agent to the surface of the image bearing member is normally incorporated into such a cleaning device (see JP 2011-170155 A, JP 2000-242135 A, and JP 2010-156778 A).

JP 2011-170155 A discloses a technique for increasing efficiency of lubricant agent application to an image bearing member by providing a flicking member that is brought into contact with a lubricant application brush and flicks off the lubricant agent in a cleaning device.

In a cleaning device that includes a lubricant application device, the cleaning properties and the blade abrasion rate vary with amounts of applied lubricant agent. Therefore, there is a demand for uniform application of a lubricant agent onto the surface of a lubricant-applied member such as an image bearing member.

SUMMARY OF THE INVENTION

In view of the above, an object of the present invention is to provide a lubricant application device that can apply a lubricant agent uniformly on the surface of a lubricant-applied member. Another object of the present invention is to provide a cleaning device and an image forming apparatus that include the lubricant application device.

To achieve at least one of the above mentioned objects, according to an aspect, a lubricant application device reflecting one aspect of the present invention comprises a lubricant supply unit and a roller-type rotatable lubricant application member that applies a lubricant agent to a lubricant-applied member, the lubricant agent being supplied from the lubricant supply unit. The lubricant application device also includes a flicking member that is brought into contact with the lubricant application member in a position that is on the downstream side of the lubricant supply unit and is on the upstream side of the lubricant-applied member in the rotation direction of the lubricant application member. The flicking member is brought into contact with the lubricant application member so that the amount of the lubricant agent to be applied to either end portion of the lubricant-applied member becomes smaller than the amount of the lubricant agent to be applied to the middle portion of the lubricant-applied member in the axial direction of the lubricant application member.

To achieve at least one of the above-mentioned objects, according to an aspect, a cleaning device reflecting one aspect of the present invention comprises a lubricant supply unit and a roller-type rotatable lubricant application member that applies a lubricant agent to a lubricant-applied member, the lubricant agent being supplied from the lubricant supply unit. The cleaning device also includes a flicking member that is brought into contact with the lubricant application member in a position that is on the downstream side of the lubricant supply unit and is on the upstream side of the lubricant-applied member in the rotation direction of the lubricant application member. The flicking member is brought into contact with the lubricant application member so that the amount of the lubricant agent to be applied to either end portion of the lubricant-applied member becomes smaller than the amount of the lubricant agent to be applied to the middle portion of the lubricant-applied member in the axial direction of the lubricant application member. The cleaning device further includes a cleaning blade that scrapes off toner remaining on the surface of the lubricant-applied member.

To achieve at least one of the above-mentioned objects, according to an aspect, an image forming apparatus reflecting one aspect of the present invention comprises the above described lubricant application device according to an aspect of the present invention.

In the lubricant application device, the cleaning device, and the image forming apparatus according to the respective aspects of the present invention, the amount of the lubricant agent to be applied to either end portion of the lubricant-applied member is made smaller than the amount of the lubricant agent to be applied to the middle portion of the lubricant-applied member, by virtue of the flicking member. Accordingly, on the surface of the lubricant-applied member, the amount of the lubricant agent to be applied to the portion where the lubricant agent is readily scraped off becomes larger than the amount of the lubricant agent to be applied to the portion where the lubricant agent is not easily scraped off.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 11A is a diagram schematically showing the structure of a flicking member used in a lubricant application device according to the third embodiment;

FIG. 11B is a diagram schematically showing the structure of a contact member used in the lubricant application device according to the third embodiment;

FIG. 12A is a diagram schematically showing another example structure of a flicking member that can be used in a lubricant application device according to the third embodiment;

FIG. 12B is a diagram schematically showing another example structure of a contact member that can be used in the lubricant application device according to the third embodiment;

FIG. 13A is a diagram schematically showing yet another example structure of a flicking member that can be used in a lubricant application device according to the third embodiment;

FIG. 13B is a diagram schematically showing yet another example structure of a contact member that can be used in the lubricant application device according to the third embodiment.

DESCRIPTION OF THE PREFERRED EMBODIMENTS

Hereinafter, an embodiment of the present invention will be described with reference to the drawings. However, the scope of the invention is not limited to the illustrated examples.

The following is a description of examples of lubricant application devices, cleaning devices, and image forming apparatuses according to embodiments of the present invention, with reference to the accompanying drawings. It should be noted that the present invention is not limited to the examples described below.

1. First Embodiment

An Example Including a Flicking Member to be Brought into Contact with Both Ends of a Lubricant Application Roller

1-1. Structure of an Entire Image Forming Apparatus

Figure 1:
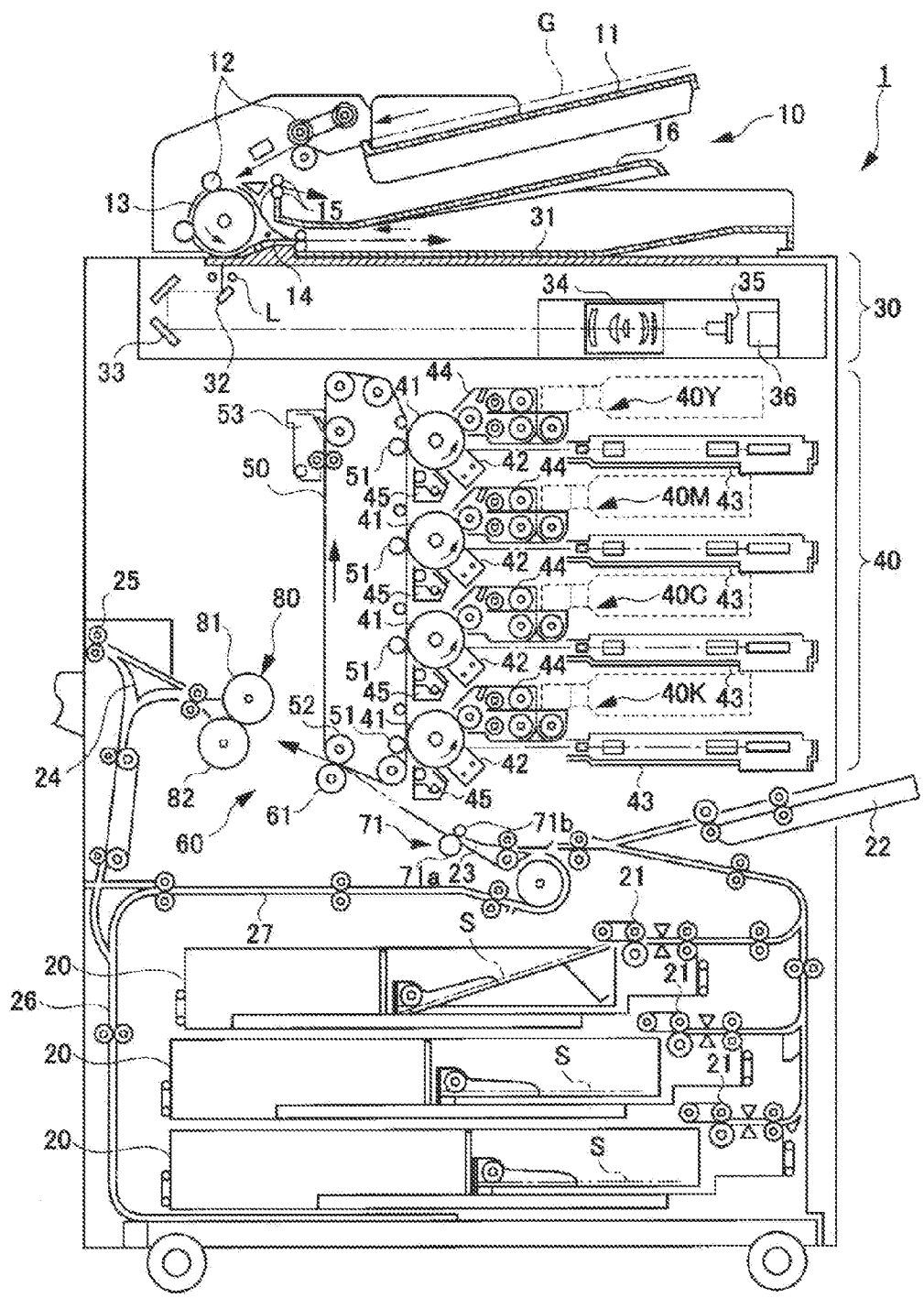
FIG. 1 is a schematic view of the structure of an image forming apparatus according to a first embodiment of the present invention.

First, the structure of an entire image forming apparatus according to a first embodiment of the present invention is described. FIG. 1 is a schematic view of the structure of the image forming apparatus 1 according to this embodiment. The image forming apparatus 1 of this embodiment is a tandem-type color-image forming apparatus that forms images on paper sheets by an electrophotographic method, and overlap toners of four colors, which are yellow (Y), magenta (M), cyan (C), and black (Bk), on one another.

As shown in FIG. 1, the image forming apparatus 1 of this embodiment includes a document conveyance unit 10, sheet storage units 20, an image reading unit 30, an image forming device 40, an intermediate transfer belt 50, a conveyance unit 23, a secondary transfer unit 60, and a fixing unit 80.

The document conveyance unit 10 includes a document feed tray 11 on which documents are to be set, rollers 12, a conveyance drum 13, a conveyance guide 14, document discharge rollers 15, and a document discharge tray 16. Documents G set on the document feed tray 11 are conveyed, one by one, to the reading position in the image reading unit 30 by the rollers 12 and the conveyance drum 13. The conveyance guide 14 and the document discharge rollers 15 discharge the documents G, which have been conveyed by the rollers 12 and the conveyance drum 13, onto the document discharge tray 16.

The image reading unit 30 reads each document G conveyed by the document conveyance unit 10 or an image of a document placed on a document tray 31, and generates an image signal. Specifically, an image of a document G is illuminated by a lamp L. Light reflected from the document G is guided through a first mirror unit 32, a second mirror unit 33, and a lens unit 34 in this order, and forms an image on the light receiving surface of an image sensor 35. The image sensor 35 photoelectrically converts incident light, and outputs the converted light as a predetermined image signal. The output image signal is subjected to A-D conversion, so that image data is generated.

The image reading unit 30 also includes an image processing unit 36. The image processing unit 36 performs processing such as shading correction, dithering, or compression on the image data generated through the A-D conversion, and stores the processed image data into a RAM 203 (see FIG. 5) of a control unit 200. The image data is not limited to data that is output from the image reading unit 30, but may be data that is received from an external apparatus such as a personal computer or another image forming apparatus connected to the image forming apparatus 1.

The sheet storage units 20 are provided in accordance with sizes of paper sheets S, and are placed below the apparatus main unit. The paper sheets S are conveyed by a sheet conveyance unit 21, and are sent to the conveyance unit 23. A manual feed unit 22 is provided in the vicinity of the sheet storage units 20. From this manual feed unit 22, paper sheets of a size that cannot be stored in any of the sheet storage units 20, tagged paper sheets having tags, or special paper sheets such as OHP sheets are sent to the transfer position.

The conveyance unit 23 is placed on the downstream side of the secondary transfer unit 60, and includes conveyance rollers and a pair of resist rollers 71 placed in the vicinity of the secondary transfer unit 60. The pair of resist rollers 71 is a pair of rollers formed with a driving roller 71*a* and a following roller 71*b* that is placed on the driving roller 71*a* and is pressed against the driving roller 71*a*. The nip portion formed between the driving roller 71*a* and the following roller 71*b* is part of the conveyance path of paper sheets S.

Each paper sheet S conveyed from the sheet conveyance unit 21 and sent to the conveyance unit 23 is then conveyed to the secondary transfer unit 60 in the transfer position by the conveyance rollers and the pair of resist rollers 71. The pair of resist rollers 71 sends the paper S to the secondary transfer unit 60 when toner image transfer becomes possible at the secondary transfer unit 60.

The image forming device 40 and the intermediate transfer belt 50 are placed between the image reading unit 30 and the sheet storage units 20. The image forming device 40 includes four image forming units 40Y, 40M, 40C, and 40K for forming toner images of the respective colors of yellow (Y), magenta (M), cyan (C), and black (Bk).

The first image forming unit 40Y forms a yellow toner image, and the second image forming unit 40M forms a magenta toner image. The third image forming unit 40C forms a cyan toner image, and the fourth image forming unit 40K forms a black toner image. Since the four image forming units 40Y, 40M, 40C, and 40K have the same structures, only the first image forming unit 40Y will be described below as a typical structure.

The first image forming unit 40Y includes a drum-like photoreceptor 41, a charging unit 42 placed around the photoreceptor 41, an exposure unit 43, a development unit 44, and a cleaning device 45. The photoreceptor 41 is rotated counterclockwise by a drive motor (not shown). The charging unit 42 uniformly charges the surfaces of the photoreceptor 41 by applying an electric charge to the photoreceptor 41. Based on the image data read from the document G, the exposure unit 43 performs an exposure operation on the surface of the photoreceptor 41, to form an electrostatic latent image on the photoreceptor 41.

The development unit 44 applies yellow toner to the electrostatic latent image formed on the photoreceptor 41. As a result, a yellow toner image is formed on the surface of the photoreceptor 41. The development unit 44 of the second image forming unit 40M applies magenta toner to the photoreceptor 41, and the development unit 44 of the third image forming unit 40C applies cyan toner to the photoreceptor 41. The development unit 44 of the fourth image forming unit 40K applies black toner to the photoreceptor 41.

The toner applied onto the photoreceptor 41 is transferred onto the intermediate transfer belt 50. After the toner is transferred onto the intermediate transfer belt 50, the cleaning device 45 removes the toner remaining on the surface of the photoreceptor 41. The structure of the cleaning device 45 will be described later.

The intermediate transfer belt 50 is of an endless type, and is rotated clockwise or in a direction opposite to the rotation direction of the photoreceptor 41 by a drive motor (not shown). A primary transfer unit 51 is provided in a position that faces the photoreceptor 41 in each of the image forming units 40Y, 40M, 40C, and 40K arranged along the intermediate transfer belt 50. The primary transfer unit 51 applies the polarity opposite from that of the toner to the intermediate transfer belt 50, to transfer the toner image formed on the photoreceptor 41 onto the intermediate transfer belt 50.

As the intermediate transfer belt 50 is rotated, the toner images formed by the four image forming units 40Y, 40M, 40C, and 40K are sequentially transferred onto the surface of the intermediate transfer belt 50. As a result, the yellow, magenta, cyan, and black toner images are overlapped on one another, and a color image is formed on the intermediate transfer belt 50.

In the vicinity of the intermediate transfer belt 50, the secondary transfer unit 60 is placed on the downstream side of the conveyance unit 23. The secondary transfer unit 60 is a pair of transfer rollers formed with an upper transfer roller 52 that supports and moves the intermediate transfer belt 50, and a lower transfer roller 61 that is pressed against the upper transfer roller 52, with the intermediate transfer belt 50 being sandwiched between the upper and lower transfer rollers 52 and 61.

At the secondary transfer unit 60, a paper sheet S sandwiched and conveyed by the pair of resist rollers 71 of the conveyance unit 23 is pressed against the intermediate transfer belt 50 by the lower transfer roller 61. The secondary transfer unit 60 then transfers the color toner image formed on the intermediate transfer belt 50 onto the paper sheet S sent from the conveyance unit 23. After the color toner image is transferred onto the paper sheet S, a cleaning unit 53 removes the toner remaining on the surface of the intermediate transfer belt 50.

The fixing unit 80 is placed on the downstream side (the discharge side) to which the paper sheet S is conveyed from the secondary transfer unit 60, and includes a pair of fixing rollers formed with an upper fixing roller 81 and a lower fixing roller 82. At the fixing unit 80, the paper sheet S having the unfixed toner image is sandwiched by the upper fixing roller 81 and the lower fixing roller 82, and is then pressed and heated, so that the toner image is fixed onto the paper sheet S.

A switching gate 24 is placed on the downstream side of the fixing unit 80. The switching gate 24 switches conveyance paths for the paper sheet S that has just passed through the fixing unit 80. Specifically, in a case where face-up sheet discharge is performed in one-side image formation, the switching gate 24 allows the paper sheet S to move in a straight line. As a result, the paper sheet S is discharged by a pair of discharging rollers 25. In a case where face-down discharge or two-side image formation is performed by discharging a paper sheet while the image formation surface in one-side image formation is caused to face down, the switching gate 24 guides the paper sheet S downward.

In a case where face-down discharge is performed, the paper sheet S is guided downward by the switching gate 24, and is reversed and guided upward by a sheet-reversing conveyance unit 26. As a result, the paper sheet S is discharged by the pair of discharging rollers 25. In a case where two-side image formation is performed, the paper sheet S is guided by the switching gate 24, is reversed by the sheet-reversing conveyance unit 26, and is sent again to the transfer position by a sheet re-feeding path 27.

A post-processing device that folds the paper sheet S or performs a stapling process or the like on the paper sheet S may be provided on the downstream side of the pair of discharging rollers 25.

1-2. Structures of the Main Components

Figure 2:
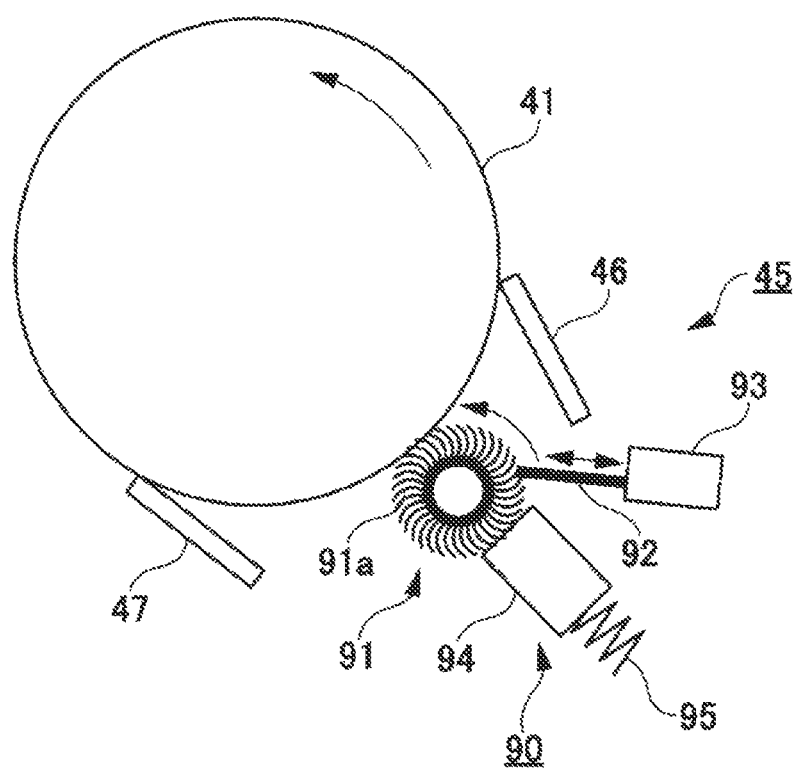
FIG. 2 is a schematic view of the structure of a cleaning device according to the first embodiment.
Figure 3:
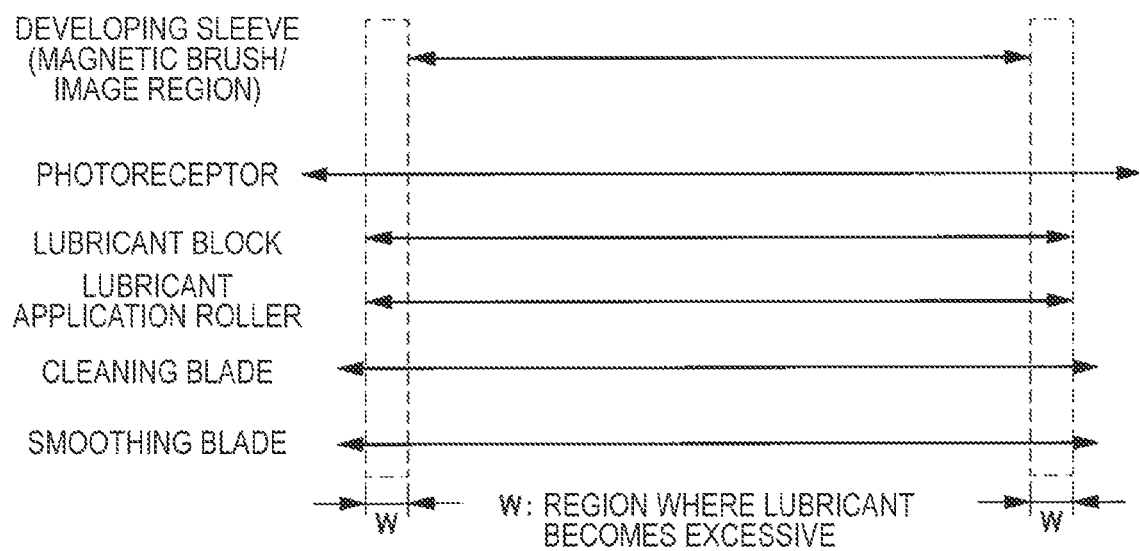
FIG. 3 is a chart showing the width of the developing sleeve of a development unit in the axial direction, the width of a photoreceptor in the axial direction, the widths of the respective components forming the cleaning device in a direction parallel to the axial direction of the photoreceptor, and the positional relationship among those components.

Next, a cleaning device and a lubricant application device that are placed in the vicinity of a photoreceptor 41 of the image forming apparatus 1 of this embodiment are described. FIG. 2 is a schematic view of the structure of a cleaning device 45 of this embodiment. FIG. 3 is a chart showing the width of the developing sleeve of the development unit 44 in the axial direction, the width of the photoreceptor 41 in the axial direction, the widths of the respective components forming the cleaning device 45 in a direction parallel to the axial direction of the photoreceptor 41, and the positional relationship among those components. The width of the developing sleeve in the axial direction is the width of the magnetic brush that applies toner to the electrostatic latent image on the photoreceptor 41, and is the width of the image region. The width of the developing sleeve in the axial direction is smaller than the width of the photoreceptor 41 in the axial direction, and the center of the developing sleeve in the axial direction corresponds to the center of the photoreceptor 41 in the axial direction.

As shown in FIG. 2, the cleaning device 45 of this embodiment includes a cleaning blade 47, a smoothing blade 46, and a lubricant application device 90.

The cleaning blade 47 is placed in a position that is close to the position where the lubricant application roller 91 of the lubricant application device 90 is brought into contact with the photoreceptor 41, and is on the upstream side of the contact position in the rotation direction of the photoreceptor 41. The cleaning blade 47 is formed with a rectangular plate-like member, and its side in the longitudinal direction (the long side) is parallel to the axial direction of the photoreceptor 41. The cleaning blade 47 is supported by a supporting member (not shown), with its long side being pressed against the surface of the photoreceptor 41. The cleaning blade 47 is supported so that the end portion pressed against the photoreceptor 41 faces the upstream side (or in the counter direction) in terms of the rotation direction of the photoreceptor 41.

As shown in FIG. 3, the width of the cleaning blade 47 in the longitudinal direction is smaller than the width of the photoreceptor 41 in the axial direction, and is greater than the width of the image region in the developing sleeve of the development unit 44. The cleaning blade 47 is formed with an elastic rubber member. The rubber material may be urethane rubber, silicon rubber, chloroprene rubber, or fluorine-containing rubber, for example. In this embodiment, the cleaning blade 47 is formed with urethane rubber.

In this embodiment, the toner (residual toner) that has not been transferred onto the intermediate transfer belt 50 but remains on the surface of the photoreceptor 41 is scraped off by the cleaning blade 47 as the photoreceptor 41 rotates. The toner scraped off from the surface of the photoreceptor 41 is gathered into a toner waste box by a collecting screw (not shown).

The smoothing blade 46 is placed in a position that is close to the position where the lubricant application roller 91 of the lubricant application device 90 is brought into contact with the photoreceptor 41, and is on the downstream side of the contact position in the rotation direction of the photoreceptor 41. The smoothing blade 46 is formed with a rectangular plate-like member, and its side in the longitudinal direction (the long side) is parallel to the axial direction of the photoreceptor 41. The smoothing blade 46 is supported by a supporting member (not shown), with its long side being pressed against the surface of the photoreceptor 41. The smoothing blade 46 is supported so that the end portion pressed against the photoreceptor 41 faces the downstream side (or in a trailing direction) in terms of the rotation direction of the photoreceptor 41.

As shown in FIG. 3, the width of the smoothing blade 46 in the longitudinal direction is smaller than the width of the photoreceptor 41 in the axial direction, and is greater than the width of the image region in the developing sleeve of the development unit 44, like the cleaning blade 47 shown in FIG. 3. The smoothing blade 46 is formed with the same material as that of the cleaning blade 47.

In this embodiment, the smoothing blade 46 smooths the lubricant agent applied by the lubricant application roller 91, and achieves uniformity in the thickness of the lubricant-applied film formed with the lubricant agent applied onto the surface of the photoreceptor 41.

The lubricant application device 90 includes the lubricant application roller 91 (the lubricant application member in the claims), a lubricant block 94 (the lubricant supply unit in the claims), and a flicking member 92. The lubricant application roller 91 is a roller-type brush member that has bristles 91a formed around a metal cored bar, and the bristles 91a may be made of a polyacrylic resin, for example. The bristles 91a are made of a synthetic resin of 2 to 15 deniers (D), the height of the bristles 91a is approximately 2 to 8 mm, the number (density) of bristles per unit area is approximately 50,000 to 300,000 per square inch, and the electric resistance is approximately $10^6$ to $10^{10} \Omega$. The outer diameter of the lubricant application roller 91 is 15 mm, where there is no deformation among the bristles 91a. Although the bristles 91a are made of an acrylic resin in this embodiment, the bristles 91a may be made of polyester, nylon, or the like.

The lubricant application roller 91 is placed on the downstream side of the cleaning blade 47 in the rotation direction of the photoreceptor 41 in such a manner that the bristles 91a are brought into contact with the surface of the photoreceptor 41. As shown in FIG. 3, the length of the lubricant application roller 91 is smaller than the length of the photoreceptor 41 in the axial direction, and is greater than the width of the developing sleeve.

The lubricant application roller 91 is rotated in the same direction as the rotation direction of the photoreceptor 41 by virtue of a driving force generated from a drive unit (not shown). Here, at the point where the lubricant application roller 91 is brought into contact with the peripheral surface of the photoreceptor 41, the lubricant application roller 91 rotates in the direction opposite to the rotation direction of the photoreceptor 41. The rotation speed of the cored bar of the lubricant application roller 91 is determined so that the linear speed of the edges of the bristles 91a becomes higher than the linear speed of the photoreceptor 41. Although the lubricant application roller 91 and the photoreceptor 41 rotate in the same direction in this embodiment, the lubricant application roller 91 and the photoreceptor 41 may rotate in the opposite directions depending on the amount of the applied lubricant agent.

The lubricant block 94 is a solid member, and is formed by melting zinc stearate powder and forming the zinc stearate powder into a cube in this embodiment. The lubricant block 94 is placed on the opposite side of the lubricant application roller 91 from the photoreceptor 41. As shown in FIG. 3, the length of the lubricant block 94 in the longitudinal direction parallel to the axial direction of the lubricant application roller 91 is substantially the same as the length of the lubricant application roller 91, and the lubricant block 94 is placed parallel to the axial direction of the lubricant application roller 91. The lubricant block 94 is pushed by an elastic member 95 such as a compression coil spring, so that the edge surface of the lubricant block 94 is pressed against and brought into contact with the surface of the lubricant application roller 91. Although zinc stearate is used as the material of the lubricant block 94 in this embodiment, it is possible to use some other material such as metal salt of fatty acid, a fluorine-containing resin, a silicone resin, a polyolefin resin.

At the photoreceptor 41, toner adheres to the surface of the photoreceptor 41 even outside the image region width. Therefore, it is necessary to ensure cleaning properties outside the image region width. In view of this, the widths of the lubricant block 94, the lubricant application roller 91, the cleaning blade 47, and the smoothing blade 46 in the longitudinal direction are greater than the width of the image region, and the centers of the lubricant block 94, the lubricant application roller 91, the cleaning blade 47, and the smoothing blade 46 in the longitudinal direction substantially correspond to one another, as shown in FIG. 3. Although the widths of the cleaning blade 47 and the smoothing blade 46 in the longitudinal direction are greater than the widths of the lubricant block 94 and the lubricant application roller 91 in this embodiment, the cleaning blade 47 and the smoothing blade 46 may have the same widths as the lubricant block 94 and the lubricant application roller 91.

As described above, so as to ensure cleaning properties, the lengths of the respective components in the longitudinal direction (the axial direction) normally satisfy the following conditions:

the cleaning blade 47 (the smoothing blade 46)≥the lubricant block 94, and the lubricant application roller 91 (the lubricant application region)>the developing sleeve (the image region width)

Meanwhile, the lubricant agent applied onto the photoreceptor 41 is easily scraped off by the magnetic brush of the developing sleeve. Therefore, in a case where the lubricant application region is wider than the developing sleeve, the lubricant agent is not scraped off outside the developing sleeve, even if an optimum amount of the lubricant agent is applied onto the surface of the photoreceptor 41 inside the developing sleeve. As a result, on the surface of the photoreceptor 41 corresponding to regions outside the developing sleeve, the amount of the applied lubricant agent becomes too large at the portions denoted by width W in FIG. 3, and large differences are caused in the thickness of the lubricant-applied film in the axial direction of the photoreceptor 41.

Where there are large differences in the thickness of the lubricant-applied film on the surface of a lubricant-applied member such as the photoreceptor 41, cleaning defects are caused, or blade wear is accelerated. In view of this, the amount of the lubricant agent adhering to the lubricant application roller 91 is adjusted by the flicking member 92 in this embodiment, so that the thickness of the lubricant-applied film formed on the photoreceptor 41 becomes uniform.

The flicking member 92 is placed in a position that is on the downstream side of the lubricant block 94 and is on the upstream side of the contact position between the photoreceptor 41 and the lubricant application roller 91 in terms of the rotation direction of the lubricant application roller 91. The flicking member 92 is supported by a supporting member (not shown) in such a manner that the end portion facing the lubricant application roller 91 can be brought into contact with the lubricant application roller 91. Further, the flicking member 92 can be moved by a stepping motor 93, so as to change the amount of contact with the lubricant application roller 91.

The flicking member 92 is formed with a flexible plate-like member, and is brought into contact with the lubricant application roller 91 in such a manner that the amount of the lubricant agent to be applied onto the photoreceptor 41 becomes smaller outside the image region than inside the image region. In this embodiment, the flicking member 92 is supported in such a manner that the end portion pressed against the bristles 91*a* faces the downstream side (a so-called trailing direction) in terms of the rotation direction of the bristles 91*a*. The flicking member 92 may be made of a resin material such as PET, polycarbonate, or PPS, or a metal material, for example.

Figure 4:
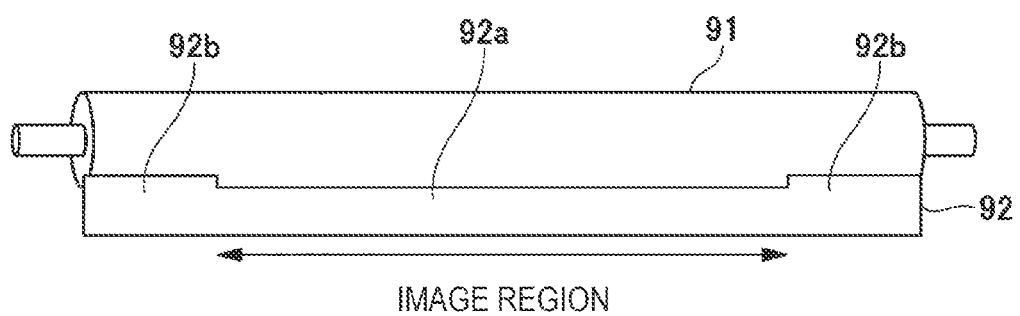
FIG. 4 is a diagram schematically showing the structure of the flicking member used in a lubricant application device according to the first embodiment.

FIG. 4 schematically shows the structure of the flicking member 92 used in a lubricant application device 90 of this embodiment. As shown in FIG. 4, the flicking member used in the lubricant application device 90 of this embodiment includes a rectangular main body 92*a* having substantially the same width in the longitudinal direction as the width of the lubricant application roller 91 in the axial direction, and contact portions 92*b* protruding from both end portions of the main body 92*a* toward the lubricant application roller 91. In the main body 92*a*, the longitudinal-direction width of the middle portion not having the contact portions 92*b* formed thereon is substantially the same as the length of the image region of the developing sleeve. That is, the flicking member 92 of this embodiment has the contact portions 92*b* protruding toward the lubricant application roller 91 at portions corresponding to regions outside the image region of the photoreceptor 41 along which the magnetic brush slides.

The amount of protrusion of the contact portions 92*b* from the main body 92*a* toward the lubricant application roller 91 is set to approximately 0.5 mm. The stepping motor 93 is driven to move the flicking member 92, so that the amount of biting into the bristles 91*a* by the contact portions 92*b* of the flicking member 92 can be adjusted.

Figure 5:
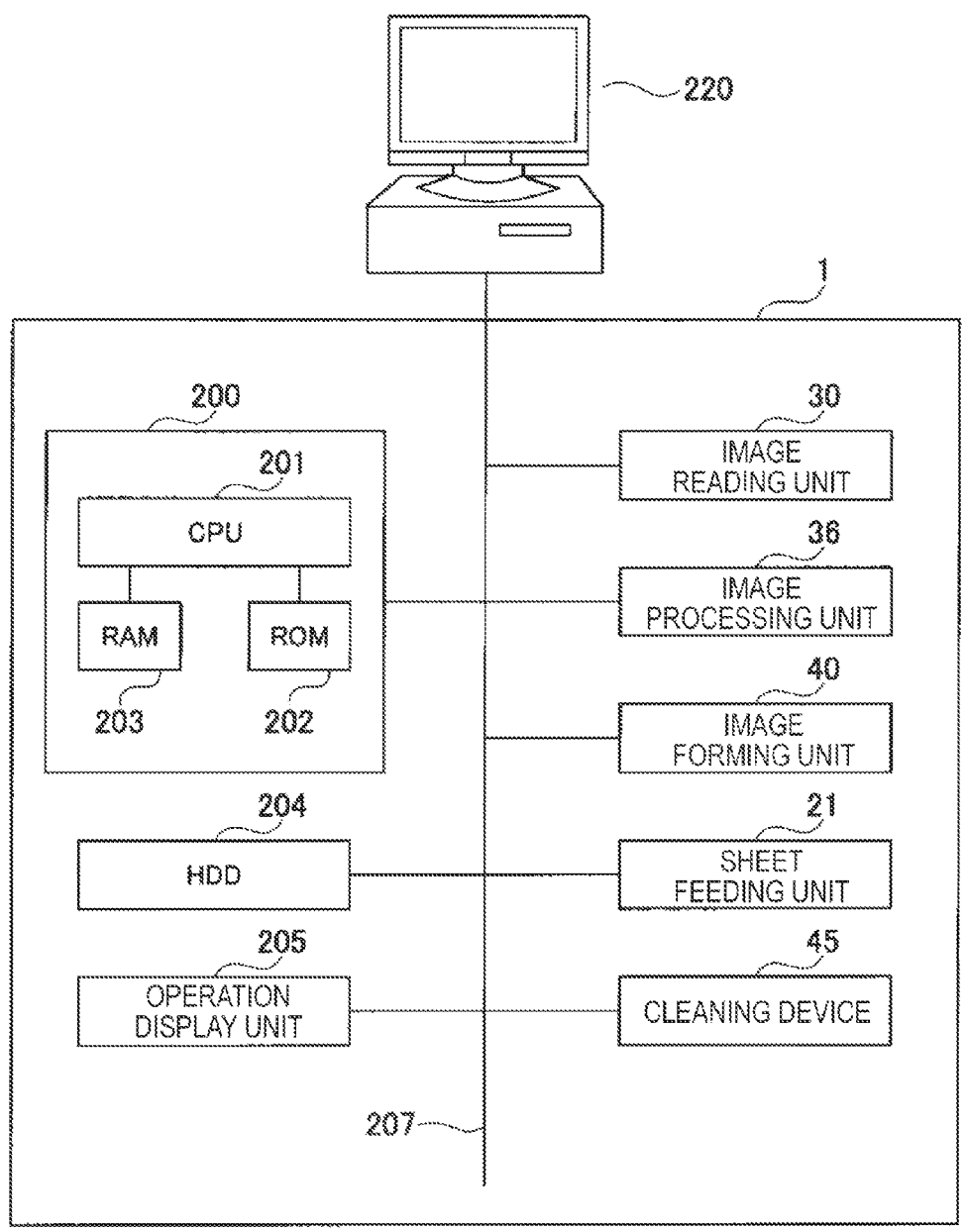
FIG. 5 is a diagram showing the structure of the control system of the image forming apparatus according to the first embodiment of the present invention.

FIG. 5 shows the configuration of the control system of the image forming apparatus 1. The image forming apparatus 1 includes the control unit 200. The control unit 200 includes a CPU (Central Processing Unit) 201, a ROM (Read Only Memory) 202 for storing programs to be executed by the CPU 201 and the like, and a RAM (Random Access Memory) 203 to be used as a work area for the CPU 201, for example. The image forming apparatus further includes a hard disk drive (HDD) 204 as a large-capacity storage device, and an operation display unit 205. The ROM 202 is a programmable ROM in which erasing can be normally performed in an electric manner.

The control unit 200 is connected to the image reading unit 30, the image processing unit 36, the image forming device 40, the sheet conveyance unit 21, the cleaning devices 45, the operation display unit 205, and the HDD 204 via a system bus 207, and controls the entire apparatus.

The HDD 204 stores the image data of document images read and obtained by the image reading unit 30, and stores already-output image data and the like. The operation display unit 205 is a touch panel formed with a display such as a liquid crystal display (LCD) or an organic ELD (Electro-Luminescence Display). This operation display unit 205 displays a command menu for the user, information related to acquired image data, and the like. The operation display unit 205 further serves as an input unit that includes keys, and receives inputs of data, such as various commands, characters, and numerals, through key operations by the user.

The image reading unit 30 optically reads a document image, and converts the image into an electric signal. In a case where a color document is read, for example, image data containing 10-bit luminance information for each color of RGB per pixel is generated. Image data generated by the image reading unit 30 and image data transmitted from a PC (personal computer) 220 as an example of an external device connected to the image forming apparatus 1 are sent to the image processing unit 36, and are then subjected to image processing. The image processing unit 36 performs image processing, such as shading correction, image density adjustment, and image compression, on received image data, as necessary. The image forming device 40 receives image data subjected to image processing by the image processing unit 36, and forms an image on a paper sheet S based on the image data.

The cleaning devices 45 apply a lubricant agent onto the surfaces of the photoreceptors 41 based on a signal transmitted from the control unit 200, and removes residual toner adhering to the surfaces of the photoreceptors 41. The control unit 200 also determines the amount of biting into the bristles 91a by the flicking members 92 of the lubricant application devices 90 used in the cleaning devices 45, and moves the flicking members 92 in accordance with the amount of biting. An example of a method of driving a cleaning device 45 will be described later in detail.

Although a personal computer is used as an external device in this example, an external device is not necessarily a personal computer, but may be any other device such as a facsimile device.

1-2. Method of Driving a Cleaning Device

Next, an example of a method of driving a cleaning device 45 of this embodiment is described. Where the photoreceptor 41 has not been used (or is in a brand-new state), the lubricant agent has not been applied onto the surface of the photoreceptor 41, and the lubricant application roller 91 does not contains the lubricant agent. A lubricant-applied film is quickly formed on the entire photoreceptor 41 during the period between the brand-new state and the time when printing is finished on approximately 1000 sheets of A4 paper. Therefore, the flicking member 92 is completely separated from the lubricant application roller 91.

If printing is continued thereafter, the lubricant-applied film on the surface of the photoreceptor 41 becomes thicker only outside the image region, since the lubricant-applied film on the surface of the photoreceptor 41 is scraped off by the magnetic brush as described above. In this case, the flicking member 92 is brought into contact with the lubricant application roller 91, and is moved so that the contact portions 92b of the flicking member 92 bite into the bristles 91a of the lubricant application roller 91 by a predetermined amount.

The lubricant application roller 91 is rotated, with both ends of the flicking member 92 biting into the bristles 91a of the lubricant application roller 91. As a result, the bristles 91a are bent in a direction opposite to the rotation direction of the lubricant application roller 91. The instant the flicking member 92 has passed, the bristles 91a promptly return to the original positions by virtue of their own restoring force. At this point, the lubricant agent adhering to the bristles 91a is flicked off. Accordingly, the amount of the lubricant agent at the portions of the lubricant application roller 91 in contact with the flicking member 92 can be reduced, and the amount of the lubricant agent to be applied to the portions of the photoreceptor 41 on which the lubricant-applied film is thick can be reduced.

If printing is further continued in the case where the flicking member 92 is in contact with the lubricant application roller 91 as described above, the bristles 91a remain bent at the portions in contact with the flicking member 92 or at the portions into which the contact portion 92b bite. Where some of the bristles 91a remain bent, the lubricant block 94 is hardly brought into contact with the corresponding portions. As a result, the amount of scraping of the lubricant agent from the lubricant block 94 decreases, and the amount of the lubricant agent adhering to the corresponding portions also decreases. In that case, the amount of biting into the bristles 91a by the contact portions 92b of the flicking member 92 may be reduced gradually or in a stepwise manner.

In a case where the amount of biting into the bristles 91a by the contact portions 92b of the flicking member 92 is reduced in a stepwise manner, the amount of biting can be adjusted as shown in Table 1 below, for example.

TABLE 1

| Number of printed sheets | Amount of biting by flicking member |
| --- | --- |
| 0 to 1,000 sheets | Separated (0 mm) |
| 1,000 to 10,000 sheets | 1.0 mm |
| 10,000 to 100,000 sheets | 0.7 mm |
| From 100,000 sheets | 0.5 mm |

In a high-temperature and high-humidity environment, the bristles 91a absorb moisture, and tend to become lower in rigidity. In a low-temperature and low-humidity environment, on the other hand, the bristles 91a tend to become higher in rigidity. Therefore, the amount of the lubricant agent scraped off by the lubricant application roller 91 varies with environments. In view of this, the contact condition of the flicking member 92 may be changed in accordance with environments. For example, the amount of biting into the bristles 91a by the contact portions 92b is adjusted to 0.7 mm in a high-temperature and high-humidity environment, and the amount of biting into the bristles 91a by the contact portions 92b is adjusted to 1.2 mm in a low-temperature and low-humidity environment.

In a case where the area of the toner image formed on the photoreceptor 41 is large, or where the coverage rate is high, the amount of toner moving to regions outside the image region increases. Particularly, if the coverage rate is high at the edges of the image region, the toner easily moves to regions outside the image region. In such a case where the amount of toner moving to regions outside the image region is large, the toner serves as an abrasive and removes the lubricant agent from the surface of the photoreceptor 41. In view of this, the contact condition of the flicking member 92 may be changed so that the minimum necessary amount of the lubricant agent is applied to the regions outside the image region of the photoreceptor 41.

In a case where the coverage rate is low, on the other hand, the contact condition of the flicking member 92 may be changed so as to reduce the amount of the lubricant agent in the regions outside the image region of the photoreceptor 41. That is, the contact condition of the contact portions 92b of the flicking member 92 is preferably changed so that the thickness of the lubricant-applied film formed on the surface of the photoreceptor 41 becomes uniform between the image region and the outside regions.

In a case where the lubricant application roller 91 continues to be rotated while the flicking member 92 is in contact therewith, the bristles 91a remain bent in a direction opposite to the rotation direction of the lubricant application roller 91 at the portions in contact with the flicking member 92. So as to reduce such bent bristles, the lubricant application roller 91 may be rotated in a direction opposite to the normal rotation direction during an "image non-formation period" during which any image is not formed on the photoreceptor 41. As the lubricant application roller 91 is rotated in a direction opposite to the normal rotation direction, the bent bristles 91a are bent in a direction opposite to the direction in which the bristles 91a have been bent by the flicking member 92. Accordingly, bent bristles are reduced, and a lubricant-applied state can be stabilized over a long period of time.

The above described adjustment of the amount of biting into the bristles 91a by the flicking member 92 is controlled by the control unit 200 shown in FIG. 5. Specifically, as the control unit 200 drives the stepping motor 93, the flicking member 92 can be moved toward and away from the lubricant application roller 91.

The contact portions 92b at both end portions of the flicking member 92 used in this embodiment protrude from the middle portion by 0.5 mm. Therefore, where the amount of biting into the bristles 91a at both end portions is adjusted to 1 mm, the middle portion of the flicking member 92 bites into the bristles 91a by 0.5 mm. As the flicking member 92 is brought into contact with all the bristles 91a in the above described manner, particles with relatively large diameters are effectively flicked off in a case where the particles of the lubricant agent scraped off from the lubricant block 94 by the lubricant application roller 91 vary in size.

As the flicking member 92 shown in FIG. 4 is used, particles with relatively large diameters can be flicked off at the middle portion of the lubricant application roller 91, and the amount of the lubricant agent adhering to both end portions can be made smaller than the amount of the lubricant agent adhering to the middle portion. Accordingly, particles with small diameters can be applied to the surface of the photoreceptor 41, and the amount of the lubricant agent to be applied to the portions where the lubricant-applied film tends to become thicker can be reduced. As a result, the thickness of the lubricant-applied film formed on the surface of the photoreceptor 41 can be more uniform.

1-3. Other Example Structures of Flicking Members

Figure 6:
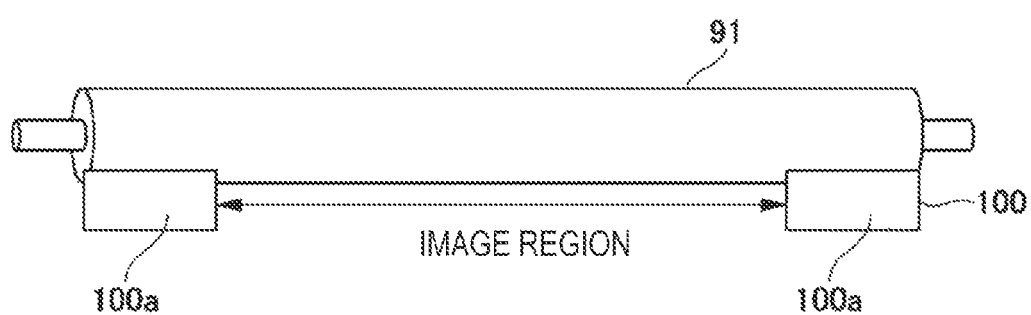
FIG. 6 shows another example of the structure of a flicking member that can be used in a lubricant application device according to the first embodiment.
Figure 7:
FIG. 7 shows yet another example of the structure of a flicking member that can be used in a lubricant application device according to the first embodiment.

Next, other example structures of flicking members are described. FIGS. 6 and 7 show other example structures of flicking members that can be used in lubricant application devices 90 of this embodiment. The flicking members shown in FIGS. 6 and 7 have different shapes from the flicking members 92 of this embodiment, and the other aspects of the structures are the same as the flicking members 92 of this embodiment.

The flicking member 100 shown in FIG. 6 is formed with two plate-like members 100a separated in the axial direction of the lubricant application roller 91, and the respective plate-like members 100a can be brought into contact with both end portions of the lubricant application roller 91 in contact with regions outside the image region of the photoreceptor 41. The plate-like members 100a each have a rectangular shape, and are supported by supporting members (not shown) so that the sides to be brought into contact with the lubricant application roller 91 become parallel to the axial direction of the lubricant application roller 91.

Although not shown in the drawing, the flicking member 100 can be moved toward and away from the lubricant application roller 91 by a stepping motor, like each flicking member of this embodiment. As the stepping motor is driven, the amount of biting into the bristles 91a by the respective plate-like members 100a forming the flicking member 100 can be adjusted.

In a case where the flicking member 100 formed with the two plate-like members 100a separated in the axial direction of the lubricant application roller 91 is provided in the above described manner, the lubricant agent adhering to the lubricant application roller 91 can be flicked off so that an excessive amount of the lubricant agent is not applied to portions where the lubricant-applied film is thick. Accordingly, the same effects as those of this embodiment can be achieved.

The flicking member 101 shown in FIG. 7 is formed with two plate-like members 101a separated in the axial direction of the lubricant application roller 91, and the respective plate-like members 101a can be brought into contact with both end portions of the lubricant application roller 91 in contact with regions outside the image region of the photoreceptor 41. Each of the plate-like members 101a has four corners, and the side to be brought into contact with the lubricant application roller 91 is tapered so that the plate-like member 101a becomes closer to the bristles of the lubricant application roller 91 in the direction from the center of the lubricant application roller 91 toward the outside. Although not shown in the drawing, the two plate-like members 101a are also supported by supporting members in the flicking member 101 shown in FIG. 7 as in this embodiment, and the flicking member 101 can be moved toward and away from the lubricant application roller 91 by a stepping motor.

The amount of toner to reach the cleaning blade 47 is smaller in regions further away from the image region. Therefore, the amount of the lubricant agent to be required for securing cleaning properties may be smaller in regions further away from the image formation width. As shown in FIG. 7, the flicking member 101 has a tapered shape, and the amount of biting into the bristles 91a by the flicking member 101 is larger in regions further away from the center of the lubricant application roller 91. In this manner, the amount of the lubricant agent to be flicked off can be made larger in regions further away from the center. Accordingly, the film formed with the lubricant agent on the surface of the photoreceptor 41 can maintain an optimum thickness.

Although each lubricant application roller 91 is a roller having the bristles 91a in this embodiment, the amount of the lubricant agent to be applied can be adjusted with the same structure in a case where each lubricant application roller 91 is a sponge roller. Although each flicking member 92 is formed with a plate-like member in this embodiment, each flicking member 92 may be formed with a stick-like member in the form of a column or a triangle pole. That is, each flicking member 92 may have any kind of shape, as long as the flocking member 92 can be brought into contact with the bristles 91a at both end portions of the lubricant application roller 91, and bite into the bristles 91a by a predetermined amount.

In this embodiment, each flicking member 92 is formed with a plate-like member, and is provided in a trailing direction with respect to the lubricant application roller 91. However, the orientation of each flocking member 92 is not limited to that. For example, the end portion of each flicking member 92 pressed against the lubricant application roller 91 may face the upstream side (the so-called counter direction) in terms of the rotation direction or the lubricant application roller 91.

2. Second Embodiment

A Structure in which a Cleaning Blade Also Serves as a Smoothing Blade

Next, the structure of an image forming apparatus according to a second embodiment of the present invention is described. The image forming apparatus of this embodiment differs from the image forming apparatus of the first embodiment only in the structure of each cleaning device. Therefore, explanation of the structure of the entire image forming apparatus will not be repeated in the description below.

Figure 8:
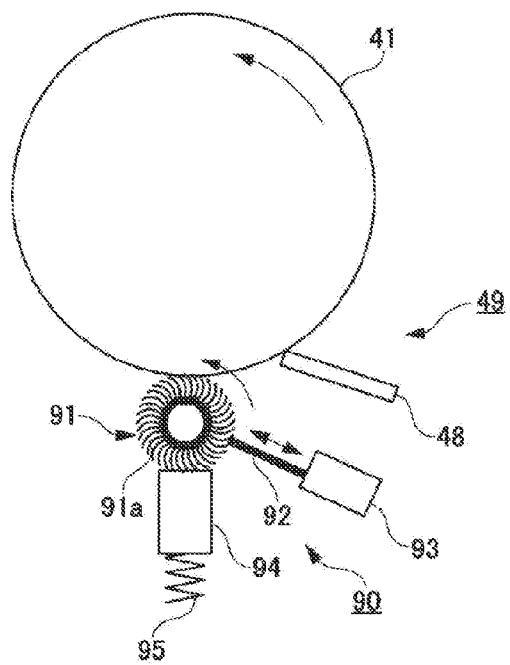
FIG. 8 is a schematic view of the structure of a cleaning device according to a second embodiment of the present invention.
Figure 9:
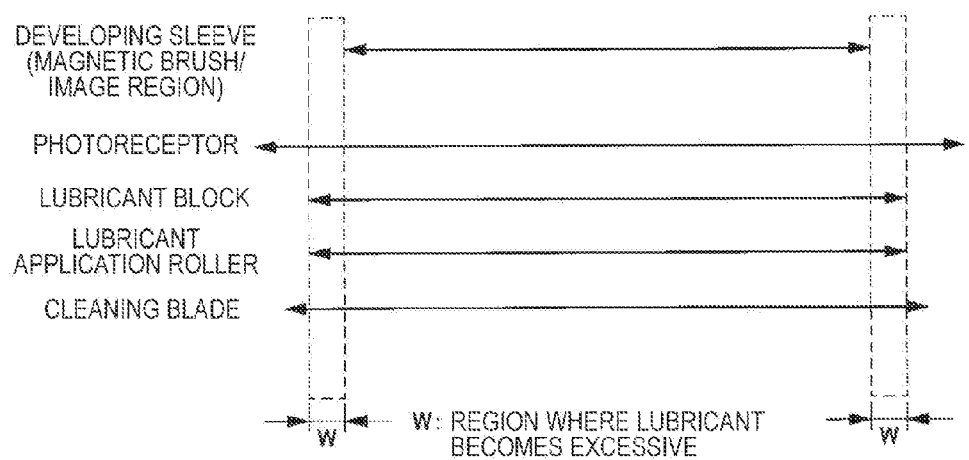
FIG. 9 is a chart showing the width of the developing sleeve of a development unit in the axial direction, the width of a photoreceptor in the axial direction, the widths of the respective components forming the cleaning device in a direction parallel to the axial direction of the photoreceptor, and the positional relationship among those components.

FIG. 8 is a schematic view of the structure of a cleaning device 49 of this embodiment. FIG. 9 is a chart showing the width of the developing sleeve of a development unit 44 in the axial direction, the width of a photoreceptor 41 in the axial direction, the widths of the respective components forming the cleaning device 49 in a direction parallel to the axial direction of the photoreceptor 41, and the positional relationship among those components. The cleaning device 49 of this embodiment differs from each cleaning device of the first embodiment in that a cleaning blade 48 also serves as a smoothing blade. In FIG. 8, the components equivalent to those shown in FIG. 2 are denoted by the same reference numerals as those used in FIG. 2, and explanation of them will not be repeated in the description below.

As shown in FIG. 9, the cleaning blade 48 is formed with a rectangular plate-like member having a longitudinal-direction width that is smaller than the width of the photoreceptor 41 in the axial direction, and is greater than the width of the image region in the developing sleeve. The cleaning blade 48 is formed with an elastic rubber member. The cleaning blade 48 may be made of the same material as the material used in the first embodiment.

The cleaning blade 48 is placed in a position that is close to the position where a lubricant application device 90 is brought into contact with the photoreceptor 41, and is on the downstream side of the contact position in the rotation direction of the photoreceptor 41. The longitudinal direction of the cleaning blade 48 is parallel to the axial direction of the photoreceptor 41. The cleaning blade 48 is supported by a supporting member (not shown), with its long side being pressed against the surface of the photoreceptor 41. The cleaning blade 48 is supported so that the end portion pressed against the photoreceptor 41 faces the upstream side (or in the counter direction) in terms of the rotation direction of the photoreceptor 41.

In this embodiment, the toner that has not been transferred onto the intermediate transfer belt 50 but remains on the surface of the photoreceptor 41 is scraped off by the cleaning blade 48 as the photoreceptor 41 rotates. The toner scraped off from the surface of the photoreceptor 41 is gathered into a toner waste box by a collecting screw (not shown). In this embodiment, the cleaning blade 48 further smooths the lubricant agent so that the lubricant agent is applied uniformly onto the surface of the photoreceptor 41 by the lubricant application device 90, and a lubricant-applied film of a uniform thickness is formed on the surface of the photoreceptor 41.

With the cleaning device 49 of this embodiment having the above structure, the amount of the applied lubricant agent also becomes too large at the portions denoted by width W in FIG. 9 for the same reason as that in the first embodiment, and large differences are caused in the thickness of the lubricant-applied film in the axial direction of the photoreceptor 41.

In this embodiment, a flicking member 92 is formed to flick off the lubricant agent adhering to both end portions of the lubricant application roller 91 as appropriate. Accordingly, the lubricant-applied film on the surface of the photoreceptor 41 can maintain a uniform thickness. In the other aspects, this embodiment can achieve the same effects as those of the first embodiment.

3. Third Embodiment

A Structure Including a Contact Member

Next, the structure of an image forming apparatus according to a third embodiment of the present invention is described. The image forming apparatus of this embodiment differs from the image forming apparatus of the first embodiment only in the structure of each cleaning device. Therefore, explanation of the structure of the entire image forming apparatus will not be repeated in the description below.

3-1. Structures of the Main Components

Figure 10:
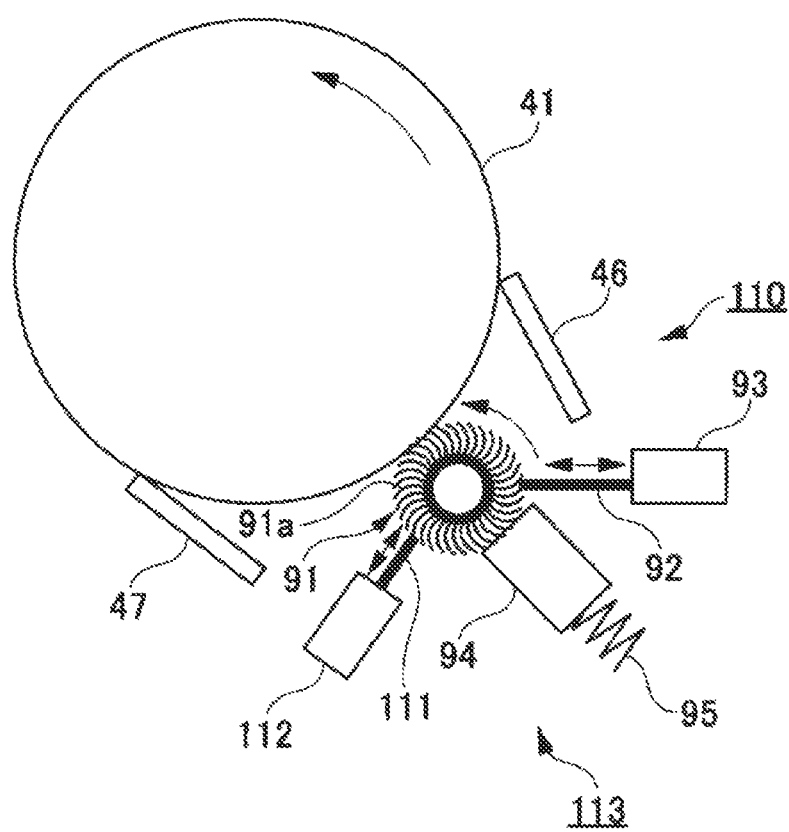
FIG. 10 is a schematic view of the structure of a cleaning device according to a third embodiment of the present invention.

FIG. 10 is a schematic view of the structure of a cleaning device 110 of this embodiment. FIGS. 11A and 11B schematically show the structures of a flicking member 92 and a contact member 111 that are used in a lubricant application device 113 of this embodiment. In FIGS. 11A and 11B, the lubricant application roller 91 shown in FIG. 10 is not shown. The cleaning device 110 of this embodiment differs from a cleaning device of the first embodiment in including the contact member 111. In FIG. 10 and FIGS. 11A and 11B, the components equivalent to those shown in FIGS. 2 and 3 are denoted by the same reference numerals as those used in FIGS. 2 and 3, and explanation of them will not be repeated in the description below.

As shown in FIG. 10, the lubricant application device 113 of this embodiment includes the flicking member 92 and the contact member 111. The structure of the flicking member 92 is the same as that of the flicking member 92 of each lubricant application device 90 of the first embodiment.

The contact member 111 is placed in a position that is on the upstream side of the lubricant block 94 and is on the downstream side of the contact position between the lubricant application roller 91 and the photoreceptor 41 in terms of the rotation direction of the lubricant application roller 91. The contact member 111 is supported by a supporting member (not shown) in such a manner that the side facing the lubricant application roller 91 can be brought into contact with the lubricant application roller 91. The contact member 111 can be moved with respect to the lubricant application roller 91 by a stepping motor 112.

The contact member 111 is formed with a flexible plate-like member, and is supported in such a manner that the end portion pressed against the bristles 91a faces the upstream side (the so-called counter direction) in terms of the rotation direction of the bristles 91a. The contact member 111 may be made of the same material as that of each flicking member 92 of the first embodiment.

As shown in FIG. 11B, the contact member 111 includes a rectangular main body 111a having substantially the same length in the longitudinal direction as the length of the lubricant application roller 91 in the axial direction, and a contact portion 111b protruding from the middle portion of the main body 111a toward the lubricant application roller 91. The width of the contact portion 111b in the longitudinal direction of the contact member 111 is substantially the same as the width of the image region, and is brought into contact with the middle portion of the lubricant application roller 91 corresponding to the image region of the photoreceptor 41.

In the contact member 111, the amount of protrusion of the contact portion 111b toward the lubricant application roller 91 is set to approximately 0.5 mm. The stepping motor 112 is driven to move the contact member 111, so that the amount of biting into the bristles 91a by the edge of the contact portion 111b of the contact member 111 can be adjusted.

3-2. Method of Driving a Cleaning Device

Next, an example of a method of driving a cleaning device 110 of this embodiment is described. In this embodiment, when the amount of the lubricant agent applied outside the image region of the photoreceptor 41 becomes larger as the number of printed sheets increases, the flicking member 92 is pressed against the bristles 91a, to reduce the amount of the lubricant agent at both end portions of the lubricant application roller 91 in the axial direction, as in the first embodiment.

In a case where only the flicking member 92 is used (or in a structure of the first embodiment), the bristles 91a at both end portions of the lubricant application roller 91 in the axial direction are bent with a stronger force from the flicking member 92 than at the middle portion. Therefore, more bristles remain bent at both end portions of the lubricant application roller 91 in the axial direction than at the middle portion. If printing is further continued with the flicking member 92 pressed against the lubricant application roller 91, the difference in the bent bristles 91a between the both end portions and the middle portion of the lubricant application roller 91 will become larger.

In view of this, the contact portion 111b of the contact member 111 of this embodiment bites into the portion where the bristles 91a are hardly bent by the flicking member 92, or into the bristles 91a at the middle portion of the lubricant application roller 91 in the axial direction. Accordingly, the bristles 91a are bent at the portion where the bristles 91a are hardly bent by the flicking member 92. As a result, the bristles 91a are uniformly bent in the axial direction of the lubricant application roller 91.

At this point, the contact member 111 is located on the upstream side of the lubricant block 94 in the rotation direction of the lubricant application roller 91. Therefore, when the contact member 111 is brought into contact with the lubricant application roller 91, the lubricant agent that adhered to the lubricant application roller 91 has already been transferred onto the photoreceptor 41, and the existence of the contact member 111 does not affect the amount of the lubricant agent applied onto the surface of the photoreceptor 41 by the lubricant application roller 91.

When the bristles 91a are bent, the portion where the bristles 91a are bent is not readily brought into contact with the lubricant block 94. As a result, the amount of the lubricant agent scraped off from the lubricant block 94 decreases, and the amount of the lubricant agent adhering to the portion decreases accordingly. In that case, the amounts of biting into the bristles 91a by the contact portions 92b of the flicking member 92 and the contact portion 111b of the contact member 111 may be reduced gradually or in a stepwise manner.

In a case where the amounts of biting into the bristles 91a by the contact portions 92b and 111b of the flicking member 92 and the contact member 111 are reduced in a stepwise manner, the amounts of biting can be adjusted as shown in Table 2 below, for example.

TABLE 2

| Number of printed sheets | Amount of biting by flicking member End portion | Amount of biting by contact member Middle portion |
| --- | --- | --- |
| 0 to 1,000 sheets | Separated (0 mm) | Separated (0 mm) |
| 1,000 to 10,000 sheets | 1.0 mm | 1.0 mm |
| 10,000 to 100,000 sheets | 0.7 mm | 0.7 mm |
| From 100,000 sheets | 0.5 mm | 0.5 mm |

As described above, when the contact state of the flicking member 92 changes, the contact state of the contact member 111 is also changed accordingly. In this manner, the load to be applied to the bristles 91a can be made uniform in the axial direction of the lubricant application roller 91. Further, the amounts of biting into the bristles 91a by the flicking member 92 and the contact member 111 can be adjusted in the same manner as in the first embodiment. In this case, the control unit 200 shown in FIG. 5 also moves the flicking member 92 and the contact member 111 in conjunction with each other.

As described above, in this embodiment, the contact member 111 is designed to be brought into contact with the region of the lubricant application roller 91 with which the flicking member 92 is not brought into contact. Accordingly, bristles 91a can be bent uniformly in the axial direction of the lubricant application roller 91. Furthermore, the contact member 111 is placed in a position that is on the downstream side of the contact position between the lubricant application roller 91 and the photoreceptor 41 and is on the upstream side of the lubricant block 94 in terms of the rotation direction of the lubricant application roller 91. With this arrangement, the amount of the lubricant agent to be scraped off by the lubricant application roller 91 is not reduced. Accordingly, the contact member 111 does not affect the lubricant-applied film to be formed on the surface of the photoreceptor 41.

3-3. Other Example Structures of Flicking Members and Contact Members

Next, other example structures of flicking members and contact members are described. FIGS. 12A and 12B and FIGS. 13A and 13B show other example structures of flicking members and contact members that can be used in lubricant application devices 113 of this embodiment. The flicking members and the contact members shown in FIGS. 12A and 12B and FIGS. 13A and 13B have different shapes from the flicking member 92 and the contact member 111 of this embodiment shown in FIGS. 11A and 11B, and the other aspects of the structures are the same as those of this embodiment.

The flicking member 100 shown in FIG. 12A has the same structure as the flicking member 100 shown in FIG. 6. The contact member 115 shown in FIG. 12B is formed with a rectangular plate-like member, and is supported by a supporting member (not shown) so that the side to be brought into contact with the lubricant application roller 91 becomes parallel to the axial direction of the lubricant application roller 91. The width of the contact member 115 in a direction parallel to the axial direction of the lubricant application roller 91 is substantially the same as the width of the image region of the photoreceptor 41, and is brought into contact with the middle portion of the lubricant application roller 91 corresponding to the image region of the photoreceptor 41.

The contact member 115 can also be moved toward and away from the lubricant application roller 91 by a stepping motor. As the stepping motor is driven, the amount of biting into the bristles 91a by the plate-like member forming the contact member 115 can be adjusted.

In the example shown in FIGS. 12A and 12B, the contact member 115 is provided, and the contact member 115 can be brought into contact with the portion where the bristles 91a are hardly bent by the flicking member 100, or with the bristles 91a at the middle portion of the lubricant application roller 91 in the axial direction. Accordingly, the bristles 91a can also be bent at the middle portion of the lubricant application roller 91 corresponding to the image region. In this manner, the bristles 91a can be bent uniformly in the axial direction of the lubricant application roller 91.

The flicking member 101 shown in FIG. 13A has the same structure as the flicking member 101 shown in FIG. 7. The contact member 116 shown in FIG. 13B is formed with a plate-like member having the same width in the longitudinal direction as the width of the lubricant application roller 91 in the axial direction, and is supported by a supporting member (not shown) so that the side to be brought into contact with the lubricant application roller 91 becomes parallel to the axial direction of the lubricant application roller 91. Each end portion of the contact member 116 has a tapered shape, and the side of each end portion facing the lubricant application roller 91 is sloped in a direction away from the lubricant application roller 91 or in a direction from the center toward the outside.

The contact member 116 can also be moved toward and away from the lubricant application roller 91 by a stepping motor. As the stepping motor is driven, the amount of biting into the bristles 91a by the plate-like member forming the contact member 116 can be adjusted.

With the structure shown in FIGS. 13A and 13B, the same effects as those of the third embodiment can be achieved. As each end portion of the contact member 116 has a tapered shape, the bristles 91a of the lubricant application roller 91 can be uniformly bent.

4. Fourth Embodiment

A Structure in which a Cleaning Blade Also Serves as a Smoothing Blade

Next, the structure of an image forming apparatus according to a fourth embodiment of the present invention is described. The image forming apparatus of this embodiment differs from the image forming apparatus of the third embodiment only in the structure of each cleaning device. The structure of the entire image forming apparatus is the same as the image forming apparatus of the first embodiment, and therefore, explanation of the structure will not be repeated in the description below.

Figure 14:
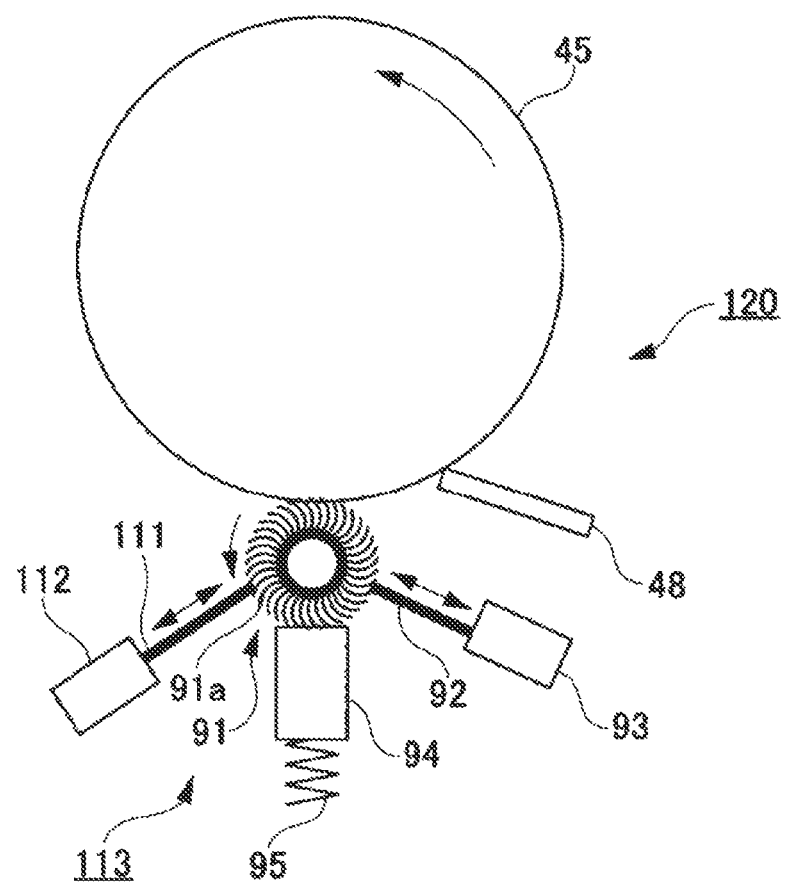
FIG. 14 is a schematic view of the structure of a cleaning device according to a fourth embodiment of the present invention.

FIG. 14 is a schematic view of the structure of a cleaning device 120 of this embodiment. The cleaning device 120 of this embodiment differs from the cleaning device of the third embodiment in that a cleaning blade 48 also serves as a smoothing blade. In FIG. 14, the components equivalent to those shown in FIG. 10 are denoted by the same reference numerals as those used in FIG. 10, and explanation of them will not be repeated in the description below.

In this embodiment, the cleaning blade 48 is also formed with a rectangular plate-like member having a longitudinal-direction width that is smaller than the width of the photoreceptor 41 in the axial direction, and is greater than the width of the image region in the developing sleeve (see FIG. 9). The cleaning blade 48 is formed with an elastic rubber member. The cleaning blade 48 may be made of the same material as the material used in the second embodiment.

The cleaning blade 48 is placed on the downstream side of the lubricant application device 113 in the rotation direction of the photoreceptor 41, and the longitudinal direction of the cleaning blade 48 is parallel to the axial direction of the photoreceptor 41. The cleaning blade 48 is supported by a supporting member (not shown), with its long side being pressed against the surface of the photoreceptor 41. The cleaning blade 48 is supported so that the end portion pressed against the photoreceptor 41 faces the upstream side (or in the counter direction) in terms of the rotation direction of the photoreceptor 41.

In this embodiment, the toner that has not been transferred onto the intermediate transfer belt 50 but remains on the surface of the photoreceptor 41 is scraped off by the cleaning blade 48 as the photoreceptor 41 rotates. The toner scraped off from the surface of the photoreceptor 41 is gathered into a toner waste box by a collecting screw (not shown). In this embodiment, the cleaning blade 48 further smooths the lubricant agent so that the lubricant agent is applied uniformly onto the surface of the photoreceptor 41 by the lubricant application device 113, and a lubricant-applied film of a uniform thickness is formed on the surface of the photoreceptor 41.

In this embodiment, a flicking member 92 and a contact member 111 are also formed. Accordingly, the lubricant-applied film formed on the surface of the photoreceptor 41 can have a uniform thickness, and the bristles 91a of the lubricant application roller 91 can be bent in a uniform manner. In the other aspects, the same effects as those of the third embodiment can be achieved.

Although an example of the lubricant-applied member is a photoreceptor in each the descriptions of the first through fourth embodiments, the present invention can also be applied in cases where an intermediate transfer belt or a secondary transfer roller is used as the lubricant-applied member. Although each cleaning device according to an embodiment of the present invention is a cleaning device placed in the vicinity of a photoreceptor, the present invention can also be applied to a cleaning device that cleans an intermediate transfer belt, a secondary transfer roller, or the like. On an intermediate transfer belt, a secondary transfer roller, or the like, the lubricant agent is also easily scraped off by toner in the image region where a toner image is formed, and the amount of the lubricant agent also tends to become too large outside the image region. In this case, the amount of the lubricant agent to be applied to an intermediate transfer belt, a secondary transfer roller, or the like can also be made uniform by using a cleaning device according to any of the first through fourth embodiments.

Although a color image forming apparatus has been described as an example in each of the first through fourth embodiments, the present invention can also be applied to a monochrome image forming apparatus. The image forming apparatus is not limited to a copying machine, and may be a printer, a facsimile machine, or a complex machine having various functions.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A lubricant application device comprising:
   a lubricant supply unit;
   a roller-type rotatable lubricant application member configured to apply a lubricant agent to a lubricant-applied member, the lubricant agent being supplied from the lubricant supply unit; and
   a flicking member to be brought into contact with the lubricant application member in a position that is on a downstream side of the lubricant supply unit and is on an upstream side of the lubricant-applied member in a rotation direction of the lubricant application member, the flicking member being brought into contact with the lubricant application member so that an amount of the lubricant agent to be applied to either end portion of the lubricant-applied member becomes smaller than an amount of the lubricant agent to be applied to a middle portion of the lubricant-applied member in an axial direction of the lubricant application member.

2. The lubricant application device according to claim 1, wherein the flicking member includes a contact portion to be brought into contact with either end portion of the lubricant application member.

3. The lubricant application device according to claim 2, wherein either end portion of the lubricant application member is a portion to be brought into contact with a region outside an image region of the lubricant-applied member.

4. The lubricant application device according to claim 3, wherein
   the lubricant-applied member is a photoreceptor, and
   either end portion of the lubricant application member is a portion to be brought into contact with a region outside the image region on a surface of the photoreceptor.

5. The lubricant application device according to claim 1, wherein the flicking member is capable of moving toward and away from the lubricant application member.

6. The lubricant application device according to claim 1, further comprising
   a contact member capable of coming into contact with the lubricant application member in a position that is on an upstream side of the lubricant supply unit and is on a downstream side of the lubricant-applied member in the rotation direction of the lubricant application member.

7. The lubricant application device according to claim 6, wherein the contact member is brought into contact with a middle portion of the lubricant application member in the axial direction of the lubricant application member.

8. The lubricant application device according to claim 6, wherein the contact member is capable of moving toward and away from the lubricant application member.

9. The lubricant application device according to claim 6, wherein the flicking member and the contact member move in conjunction with each other.

10. The lubricant application device according to claim 6, wherein
    the lubricant application member has bristles on a surface thereof, and
    the rotation direction of the lubricant application member is reversed during an image non-formation period during which any image is not formed.

11. A cleaning device comprising:
    a lubricant supply unit;
    a roller-type rotatable lubricant application member configured to apply a lubricant agent to a lubricant-applied member, the lubricant agent being supplied from the lubricant supply unit;
    a flicking member to be brought into contact with the lubricant application member in a position that is on a downstream side of the lubricant supply unit and is on an upstream side of the lubricant-applied member in a rotation direction of the lubricant application member, the flicking member being brought into contact with the lubricant application member so that an amount of the lubricant agent to be applied to either end portion of the lubricant-applied member becomes smaller than an amount of the lubricant agent to be applied to a middle portion of the lubricant-applied member in an axial direction of the lubricant application member; and
    a cleaning blade configured to scrape off toner remaining on a surface of the lubricant-applied member.

12. The cleaning device according to claim 11, wherein the flicking member includes a contact portion to be brought into contact with either end portion of the lubricant application member.

13. The cleaning device according to claim 12, wherein either end portion of the lubricant application member is a portion to be brought into contact with a region outside an image region of the lubricant-applied member.

14. The cleaning device according to claim 13, wherein
    the lubricant-applied member is a photoreceptor, and
    either end portion of the lubricant application member is a portion to be brought into contact with a region outside the image region on a surface of the photoreceptor.

15. The cleaning device according to claim 11, wherein the flicking member is capable of moving toward and away from the lubricant application member.

16. The cleaning device according to claim 11, further comprising a smoothing blade configured to smooth lubricant agent applied by the lubricant application member.

17. An image forming apparatus comprising
    a lubricant application device including:
    a lubricant supply unit;
    a roller-type rotatable lubricant application member configured to apply a lubricant agent to a lubricant-applied member, the lubricant agent being supplied from the lubricant supply unit; and
    a flicking member to be brought into contact with the lubricant application member in a position that is on a downstream side of the lubricant supply unit and is on an upstream side of the lubricant-applied member in a rotation direction of the lubricant application member, the flicking member being brought into contact with the lubricant application member so that an amount of the lubricant agent to be applied to either end portion of the lubricant-applied member becomes smaller than an amount of the lubricant agent to be applied to a middle portion of the lubricant-applied member in an axial direction of the lubricant application member.

18. The image forming apparatus according to claim 17, wherein the flicking member includes a contact portion to be brought into contact with either end portion of the lubricant application member.

19. The image forming apparatus according to claim 18, wherein either end portion of the lubricant application member is a portion to be brought into contact with a region outside an image region of the lubricant-applied member.

20. The image forming apparatus according to claim 19, wherein the lubricant-applied member is a photoreceptor, and either end portion of the lubricant application member is a portion to be brought into contact with a region outside the image region on a surface of the photoreceptor.

21. The image forming apparatus according to claim 17, wherein the flicking member is capable of moving toward and away from the lubricant application member.

22. The image forming apparatus according to claim 20, further comprising:

a cleaning blade configured to scrape off toner remaining on a surface of the lubricant-applied member; and a smoothing blade configured to smooth lubricant agent applied by the lubricant application member.

* * * * *